United States Patent
Chang

(10) Patent No.: US 8,036,084 B2
(45) Date of Patent: Oct. 11, 2011

(54) STANDALONE DUPLICATION SYSTEM WITH NETWORK CONNECTION

(75) Inventor: Shuo-Wei Chang, Alhambra, CA (US)

(73) Assignee: Vinpower Inc., Alhambra, CA (US)

( * ) Notice: Subject to any disclaimer, the term of this patent is extended or adjusted under 35 U.S.C. 154(b) by 218 days.

(21) Appl. No.: 12/559,620

(22) Filed: Sep. 15, 2009

(65) Prior Publication Data

US 2011/0063955 A1 Mar. 17, 2011

(51) Int. Cl.
*G11B 3/64* (2006.01)
*G06F 13/00* (2006.01)

(52) U.S. Cl. .............. 369/84; 369/30.19; 369/30.27; 711/114

(58) Field of Classification Search .......... 369/30.27, 369/30.28, 30.33, 30.34, 30.19, 84; 711/111–114; 719/322, 325; 726/2–4, 16, 17; 709/727–729, 709/213
See application file for complete search history.

(56) References Cited

U.S. PATENT DOCUMENTS

| | | | |
|---|---|---|---|
| 7,159,080 B1 * | 1/2007 | Coatney et al. | 711/114 |
| 2005/0198553 A1 * | 9/2005 | Okamoto et al. | 711/114 |
| 2005/0216664 A1 * | 9/2005 | Taninaka et al. | 711/114 |
| 2005/0228941 A1 * | 10/2005 | Abe et al. | 711/113 |
| 2006/0047900 A1 * | 3/2006 | Tanaka et al. | 711/113 |
| 2006/0140576 A1 * | 6/2006 | Oka | 386/46 |
| 2007/0067565 A1 * | 3/2007 | Taninaka et al. | 711/114 |
| 2008/0005396 A1 * | 1/2008 | Suzuki et al. | 711/112 |
| 2008/0010647 A1 * | 1/2008 | Chapel et al. | 719/326 |
| 2008/0040541 A1 * | 2/2008 | Brockmann | 711/114 |
| 2008/0118223 A1 * | 5/2008 | Kamiwada et al. | 386/83 |
| 2009/0034377 A1 * | 2/2009 | English et al. | 369/47.13 |
| 2009/0262622 A1 * | 10/2009 | Chang et al. | 369/84 |

* cited by examiner

*Primary Examiner* — Thang Tran
(74) *Attorney, Agent, or Firm* — Alan Kamrath; Kamrath & Associates PA

(57) ABSTRACT

A standalone duplication system with network connection has a casing, multiple recording devices, a control module, a bridge unit, a storage device and a network module, wherein the bridge unit connects between the control module, the storage device and the network module. When the bridge unit confirms that the control module has disconnected from the storage device and the network module receives a data transfer command, the storage device can receive data via the network module and store data for duplication. Therefore, the standalone duplication system is capable of receiving data from different computers over a network without using a high-end central processing unit (CPU). The standalone duplication system need not be moved to different places and connected to and disconnected from different personal computers again and again. Users operate their own personal computers to send required data to the standalone duplication system via the network.

18 Claims, 6 Drawing Sheets

STANDALONE DUPLICATION SYSTEM WITH NETWORK CONNECTION

BACKGROUND OF THE INVENTION

1. Field of the Invention

The invention relates to a standalone duplication system, in particular, the invention relates to a standalone duplication system that is capable of connecting to a network.

2. Description of Related Art

Recordable medium, like Optical discs, are a widely used and popular commodity in today's society, as shown by multiple conventional optical disc recording devices used to duplicate one or multiple optical discs, including, dedicated personal computers and standalone duplication systems.

A personal computer typically has one recording device, and therefore can only write one optical disc per recording session. If multiple optical discs are required to be duplicated, then multiple back-to-back recording sessions of one disc at a time must be performed sequentially, with the discs being manually loaded and unloaded. Further, high-density optical discs such as DVD and Blu-ray discs are now widely available. Duplicating multiple high-density optical discs will take a prolonged amount of time.

A conventional standalone duplication system comprises of a casing which is equipped with a reading source and multiple stacked recording devices that can simultaneously duplicate multiple recordable medium from a source loaded in the reading source. Since users can operate a control panel on the casing to command a control module in the standalone duplication system to complete the recording sessions, the standalone duplication system need not be connected to a personal computer. Further, because the standalone duplication system only performs duplication, such duplication can be achieved using a central processing unit (CPU) with basic data processing ability. So a high-end CPU, as applied in personal computers, is not required.

Another option in conventional standalone duplication systems is to integrate the standalone duplication system with a hard disk. Data to be duplicated can be transmitted from the personal computer to the hard disk via a USB interface. After the data has been stored in the hard disk, the users operate the control panel to select desired data from the hard disk and initiate a recording process. The foregoing standalone duplication system still does not need to use a high-end CPU to process complex data computation because the CPU performs only simple control tasks; however, positioning of the standalone duplication system with the built-in hard disk is limited as it needs to be near the personal computer in order to establish a wired connection between the duplication system and the personal computer through a USB cable. When a single standalone duplication system is shared among different users, the standalone duplication system must be moved to different places and connected to and disconnected from different personal computers again and again.

Therefore, a new generation of standalone duplication systems with network connection capability is expected to permit multiple personal computers to remotely transfer data to the hard disk of the standalone duplication system over a network. However, when assessing the CPU of a conventional standalone duplication system with a built-in hard disk, most CPU's do not possess the powerful data computation ability as a more typical CPU commonly found in personal computers. If the control module of the standalone duplication system is expected to perform recording sessions and process data transmission over the network as what a personal computer does, instituting a high-end CPU along with a substantial modification of the control module will cause a significant increase in manufacturing costs thus increasing the sale price of the standalone duplication system.

To overcome these shortcomings, the present invention provides a standalone duplication system with network connection to mitigate or obviate the aforementioned problems.

SUMMARY OF THE INVENTION

An objective of the invention is to provide a standalone duplication system that can connect to a given network to receive data from different computers within the same domain which are to be duplicated.

A standalone duplication system with network connection has a casing, multiple recording devices, a control module, a bridge unit, a storage device and a network module, wherein the bridge unit connects between the control module, the storage device and the network module. When the bridge unit confirms that the control module has disconnected from the storage device and the network module receives a data transfer command, the storage device is able to receive data via the network module and store data for duplication. Therefore, the standalone duplication system is capable of receiving data from different computers over a network without using a high-end central processing unit (CPU).

Based on the above-mentioned descriptions, the standalone duplication system need not be moved to different places and connected to and disconnected from different personal computers again and again. Users operate their own personal computers to connect to and send required data to the standalone duplication system. In addition, the mechanism by which the standalone duplication system interacts can remain unchanged whereas the present invention is an add-on which will greatly reduce the overall cost of production.

Other objectives, advantages and novel features of the invention will become more apparent from the following detailed description when taken in conjunction with the accompanying drawings.

DETAILED DESCRIPTION OF THE PREFERRED EMBODIMENT

A standalone duplication system with the network connection in accordance with the present invention can be operated either in a duplication mode or a network transfer mode for duplicating recordable medium or receiving data through network from computers respectively. The duplication mode is the default mode of the standalone duplication system.

Figure 1:
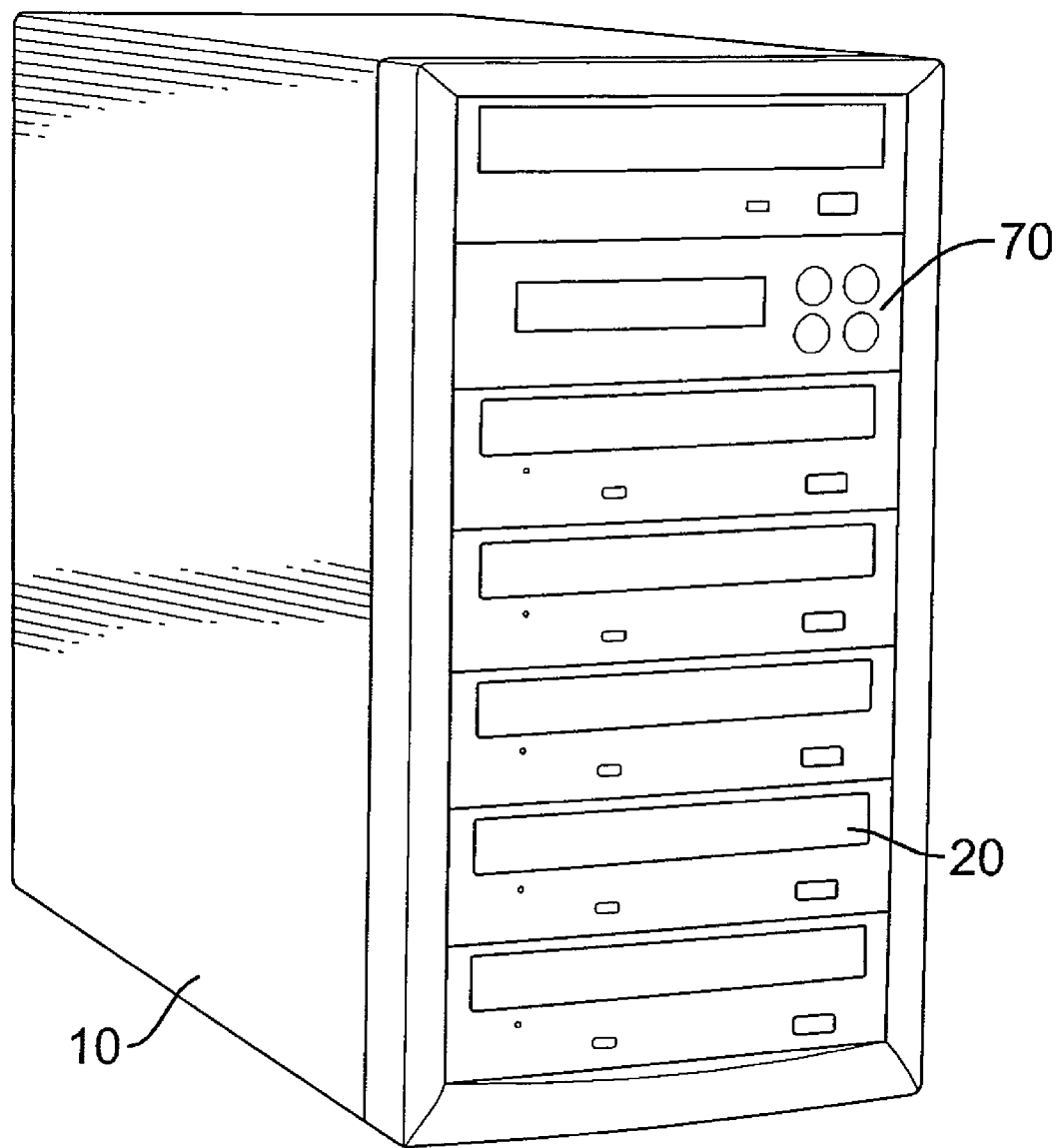
FIG. 1 is a perspective view of a standalone duplication system with network connection in accordance with the present invention.
Figure 2:
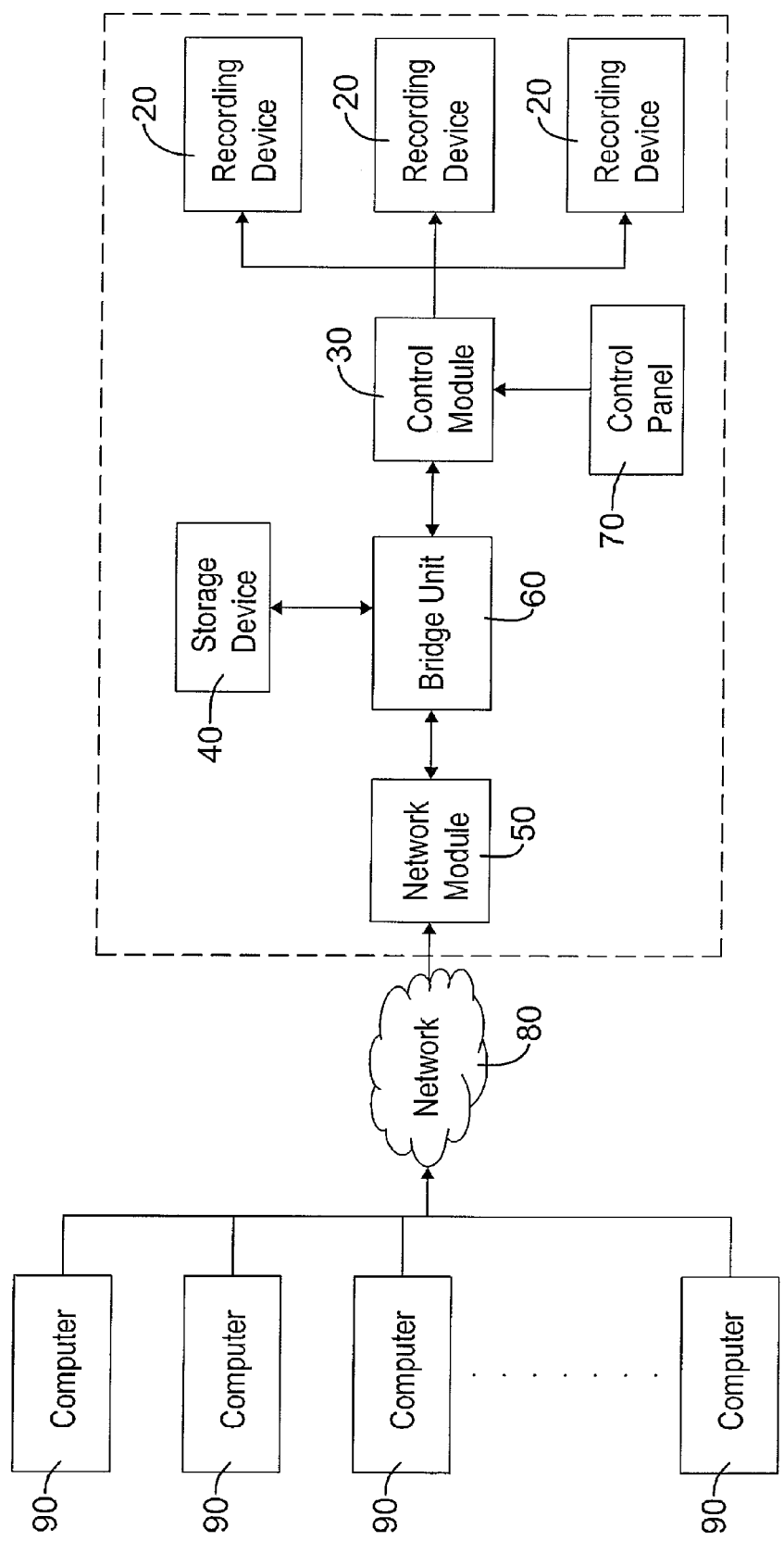
FIG. 2 is functional block diagram of the standalone duplication system with network connection in accordance with the present invention.

With reference to FIGS. 1 and 2, the standalone duplication system comprises a casing (10), multiple recording devices (20), a control module (30), a storage device (40), a network module (50), a bridge unit (60) and a control panel (70).

The recording devices (20) are installed in the casing (10) for loading, unloading and recording recordable medium.

The control module (30) in the casing (10) is electrically connected to the recording devices (20), and the control module (30) controls the recording devices (20) to record recordable medium when the standalone duplication system is operated in the duplication mode. It is noted that the control module (30) comprises a central processing unit (CPU) as used in existing standalone duplication systems, not a high-end CPU used in personal computers.

The storage device (40) in the casing (10) is electrically connected to the control module (30) through the bridge unit (60). When the standalone duplication system is operated in the duplication mode, the control module (30) accesses data stored in the storage device (40) and controls the recording devices (20) to record the required data onto the recordable medium. The storage device (40) may be implemented as a hard disk, a flash memory, a flash-memory based device such as a solid-state drive and etc. In a preferred embodiment, the storage device (40) is a hard disk.

The network module (50) is connected to the storage device (40) through the bridge unit (60) and is able to connect to network (80) via a standard network communication protocol such as TCP/IP. When the standalone duplication system is operated in the network transfer mode and the network module (50) has been connected to the network (80), the storage device (40) will be registered as a network storage device and be accessible by other computers (90) within the same domain through the network communication protocol. The network module (50) stores and performs a data transfer process. When the network module (50) has received a data transfer command sent from any of the computers (90), the data transfer process allows the data to be subsequently received from the network (80) and be stored in the storage device (40).

Figure 4:
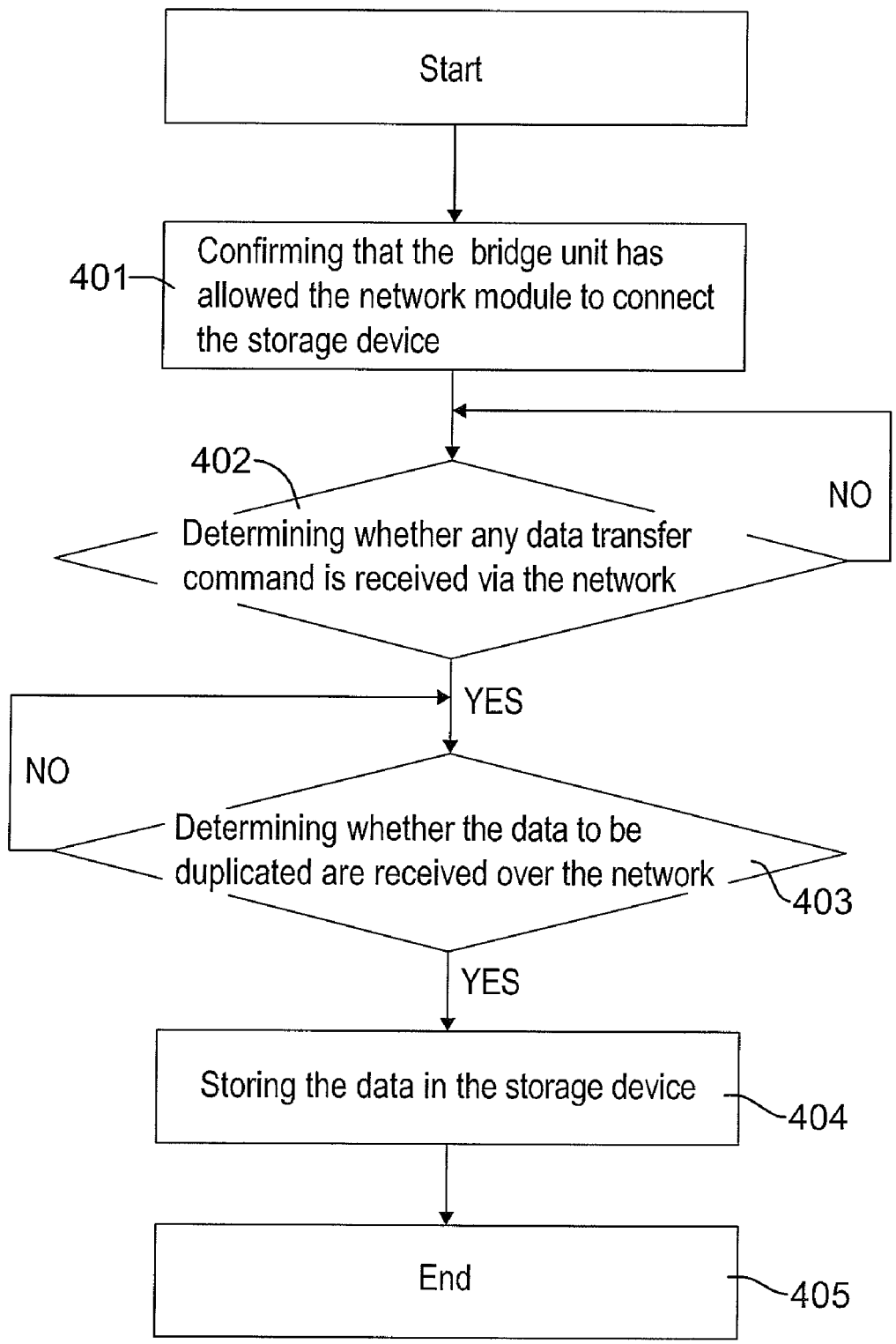
FIG. 4 is a flow chart of a data transfer process in accordance with the present invention.

With further reference to FIG. 4, the data transfer process comprises steps of confirming that the bridge unit has allowed the network module to connect the storage device (401), determining whether any data transfer command is received via the network (402), determining whether the data to be duplicated are received over the network (403), storing the data in the storage device (404) if the data are received, and ending the process (405).

The bridge unit (60) connects the control module (30), the storage device (40) and the network module (50) and stores a switch control process. The switch control process provides the control module (30) with high priority to access the storage device (40). When the control module (30) releases its access right to the storage device (40), the bridge unit (60) allows the network module (50) to control the storage device (40) and the standalone duplication system is operated in the network transfer mode. If any of the computers (90) sends the data transfer command to the network module (50), the data transfer process is activated to allow the storage device (40) to store the data subsequently received through the network module (50). Preferably, the bridge unit (60) may be implemented as a circuit board or software installed in the control module (30).

Figure 3:
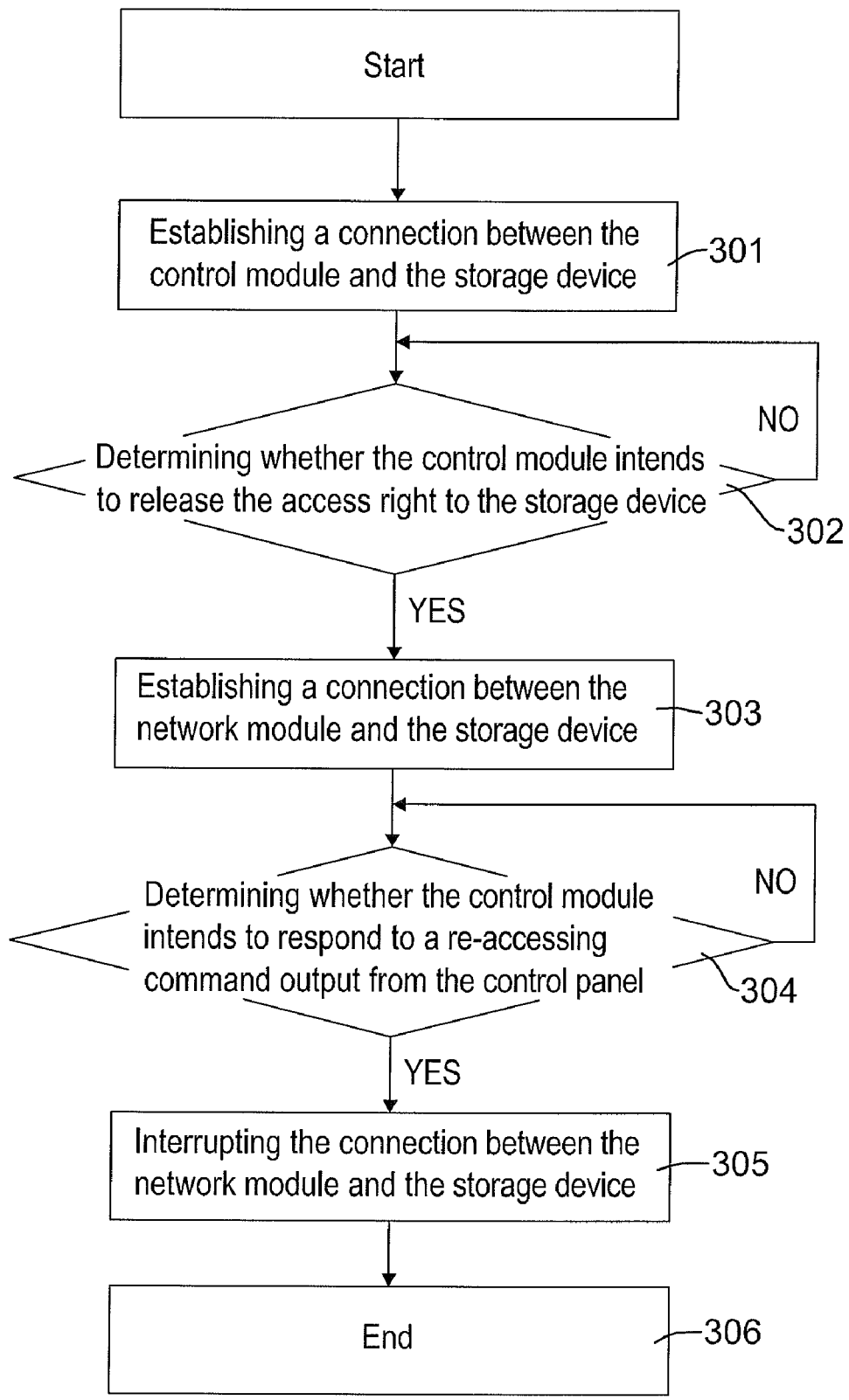
FIG. 3 is a flow chart of a switch control process in accordance with the present invention.

With further reference to FIG. 3, the switch control process comprises steps of establishing a connection between the control module and the storage device (301), determining whether the control module intends to release the access right to the storage device (302), establishing a connection between the network module and the storage device when the control module has released the access right (303), determining whether the control module intends to respond to a re-accessing command output from the control panel (304), interrupting the connection between the network module and the storage device if the control module responds to the re-accessing command (305), and ending the process (306).

The control panel (70) is mounted on the casing (10) and electrically connected to the control module (30) to produce an interrupt command based on a user's operation. Upon receipt of the interrupt command, the control module (30) releases the access right to the storage device (40) to command the standalone duplication system operate in the network transfer mode. In this embodiment the control panel (70) can further produce a re-accessing command according to the user's operation. Once the control module (30) receives the re-accessing command, the bridge unit (60) will be noticed that the control module (30) is going to retrieve the access right to the storage device (40). Even though the bridge unit (60) will interrupt the communication between the storage device (40) and the network module (50) immediately, the control module (30) still have to retrieve the access right to the storage device (40). Retrieving the access right may be achieved by rebooting the standalone duplication system via manual operation or software to initialize the bridge unit (60), or by rescanning hardware port of the standalone duplication system via software.

Figure 5:
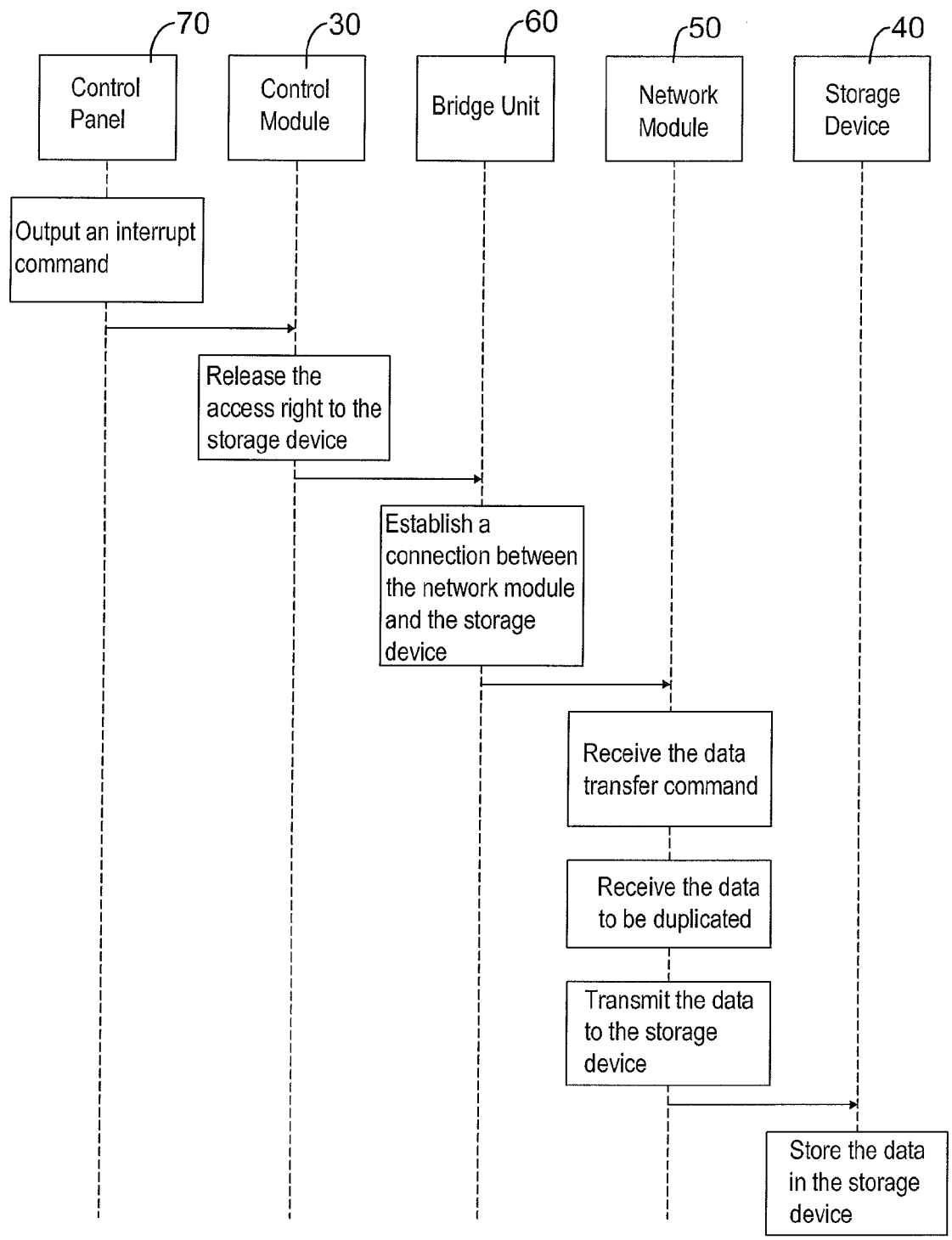
FIG. 5 is a sequence diagram, showing the standalone duplication system in accordance with the present invention switching to a network transfer mode from a duplication mode.

With reference to FIG. 5, an embodiment of the operating sequences of changing the standalone duplication system from the default duplication mode to the network transfer mode is shown in detail. Based on the user's operation on the control panel (70), the control module (30) notifies the bridge unit (60) that the access right to the storage device (40) is going to be released so that the standalone duplication system can be operated in the network transfer mode to connect the storage device (40) to the network module (50) via the bridge unit (60). Once the network module (50) connects to the network (80), any computer (90) within the same domain as the standalone duplication system can link to the network module (50). When the network module (50) receives the data transfer command and subsequent data to be transmitted from the computer (90), the received data are allowed to be stored in the storage device (40).

Figure 6:
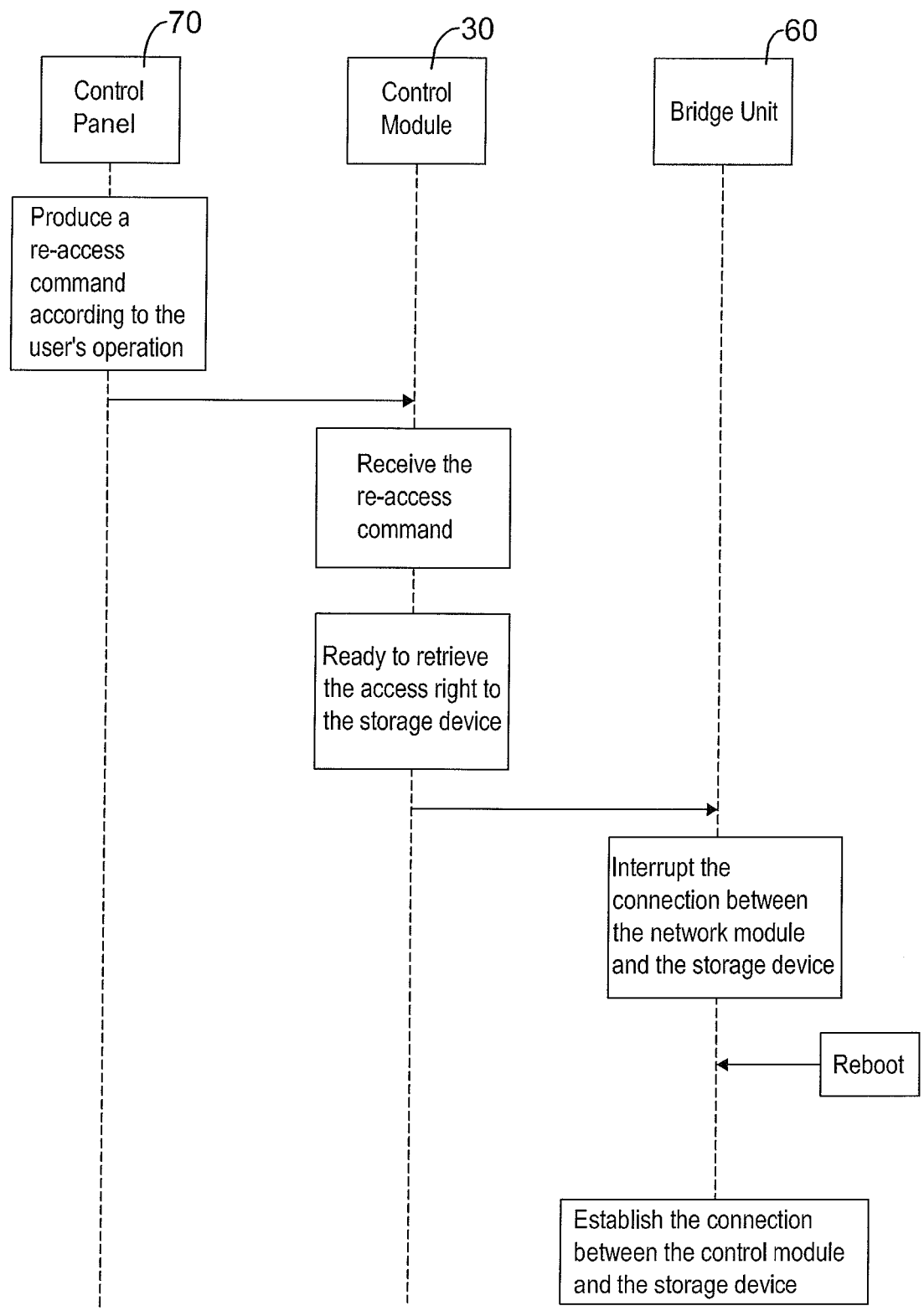
FIG. 6 is a sequence diagram, showing the standalone duplication system in accordance with the present invention switching to a duplication mode from a network transfer mode.

After the standalone duplication system finishes data transfer, the standalone duplication system can be returned to the duplication mode. With reference to FIG. 6, an embodiment of the operating sequences of changing the standalone duplication system from the network transfer mode to the default duplication mode is shown in detail. Based on the user's operation on the control panel (70), the control module (30) notices the bridge unit (60) that the access right to the storage device (40) will be retrieved and the existing connection between the network module (50) and the storage device (40) is interrupted. After the connection has been cut off, the control module (30) may retrieve the access right by rebooting the standalone duplication system via manual operation or software to initialize the bridge unit (60), or by rescanning hardware port of the standalone duplication system via software. In this embodiment the standalone duplication system is rebooted. Accordingly, the standalone duplication system operates in the duplication mode to record data in the storage device (40) onto blank discs loaded in the recording devices (20).

With the bridge unit (60), the standalone duplication system of the present invention can connect to the network (80)

without a high-end CPU. The duplication mode of the standalone duplication system allows the control module (30) to connect to and access the storage device (40) for data burning. The network transfer mode allows the standalone duplication system to easily receive data to be burned from different computers (90) over the network (80). The standalone duplication system of the present invention provides an easier and more convenient way to allow users to transmit data to the standalone duplication system via network (80).

Since the standalone duplication system of the present invention is accessible by different computers (90) within the same domain via a network (80), it does not need to be frequently moved for achieving a wire connection with multiple computers.

Further, the data to be duplicated can be converted to a disc image file and transmitted to the storage device (40) in advance, thereby saving time to burn and record the data onto the recordable medium.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A standalone duplication system with network connection comprising:
    a casing;
    multiple recording devices installed in the casing for loading, unloading and recording recordable medium;
    a control module mounted in the casing, electrically connected to the recording devices and controlling the recording devices to record data onto the recordable medium;
    a storage device mounted in the casing, electrically connected to the control module and storing data to be accessed by the control module to record onto the recordable medium;
    a network module mounted in the casing, storing a data transfer process and adapted to connect to a network, wherein the data transfer process controls data received by the network module to be stored in the storage device after the network module has received a data transfer command over the network;
    a bridge unit connected between the control module, the storage device and the network module, and storing a switch control process, wherein the switch control process provides the control module with high priority to access the storage device and permits the network module to connect to the storage device when the control module releases access right to the storage device; and
    a control panel mounted on the casing and electrically connected to the control module to produce an interrupt command, wherein the control module releases the access right to the storage device upon reception of the interrupt command.

2. The standalone duplication system as claimed in claim 1, wherein the bridge unit is implemented as a circuit board.

3. The standalone duplication system as claimed in claim 1, wherein the bridge unit is implemented as software installed in the control module.

4. The standalone duplication system as claimed in claim 1, wherein the switch control process comprises steps of:
    establishing a connection between the control module and the storage device;
    determining whether the control module intends to release the access right to the storage device; and
    establishing a connection between the network module and the storage device when the control module has released the access right.

5. The standalone duplication system as claimed in claim 4, wherein the control panel further produces a re-accessing command based on a user's operation, and the control module notices the bridge unit that the access right to the storage device will be retrieved.

6. The standalone duplication system as claimed in claim 5, wherein after the step of establishing a connection between the network module and the storage device, the switch control process further comprises steps of:
    determining whether the control module intends to respond to the re-accessing command output from the control panel; and
    interrupting the connection between the network module and the storage device if the control module responds to the re-accessing command.

7. The standalone duplication system as claimed in claim 1, wherein the storage device is a hard disk.

8. The standalone duplication system as claimed in claim 2, wherein the storage device is a hard disk.

9. The standalone duplication system as claimed in claim 3, wherein the storage device is a hard disk.

10. The standalone duplication system as claimed in claim 4, wherein the storage device is a hard disk.

11. The standalone duplication system as claimed in claim 5, wherein the storage device is a hard disk.

12. The standalone duplication system as claimed in claim 6, wherein the storage device is a hard disk.

13. The standalone duplication system as claimed in claim 1, wherein the storage device is a flash memory or a flash-memory based device.

14. The standalone duplication system as claimed in claim 2, wherein the storage device is a flash memory or a flash-memory based device.

15. The standalone duplication system as claimed in claim 3, wherein the storage device is a flash memory or a flash-memory based device.

16. The standalone duplication system as claimed in claim 4, wherein the storage device is a flash memory or a flash-memory based device.

17. The standalone duplication system as claimed in claim 5, wherein the storage device is a flash memory or a flash-memory based device.

18. The standalone duplication system as claimed in claim 6, wherein the storage device is a flash memory or a flash-memory based device.

* * * * *